United States Patent
Shin et al.

(10) Patent No.: US 10,096,433 B1
(45) Date of Patent: Oct. 9, 2018

(54) METHOD OF MANUFACTURING POROUS CURRENT COLLECTOR

(71) Applicant: KOREA JCC CO., LTD., Cheongwon-gun (KR)

(72) Inventors: Jin Sik Shin, Cheongju-si (KR); Dal Woo Shin, Cheongju-si (KR); Mun Soo Lee, Cheongju-si (KR); Sung Han Kim, Cheongju-si (KR); Mi Hyun Oh, Cheongju-si (KR); Hyun Yun, Sokcho-si (KR); Ji Yoon Park, Cheongju-si (KR); Kyoung Nam Lee, Cheongju-si (KR)

(73) Assignee: KOREA JCC CO., LTD., Cheongwon-Gun (KR)

( * ) Notice: Subject to any disclaimer, the term of this patent is extended or adjusted under 35 U.S.C. 154(b) by 0 days.

(21) Appl. No.: 15/938,303

(22) Filed: Mar. 28, 2018

(30) Foreign Application Priority Data

Dec. 12, 2017 (KR) .......................... 10-2017-0170235

(51) Int. Cl.
*H01G 11/84* (2013.01)
*C23F 1/02* (2006.01)
*C23F 1/16* (2006.01)
*H01G 11/70* (2013.01)

(52) U.S. Cl.
CPC ............... *H01G 11/84* (2013.01); *C23F 1/02* (2013.01); *C23F 1/16* (2013.01); *H01G 11/70* (2013.01)

(58) Field of Classification Search
CPC ........................................................ H01G 11/84
USPC ................................................................ 216/6
See application file for complete search history.

(56) References Cited

U.S. PATENT DOCUMENTS 8,426,068 B2 4/2013 Matsuda et al.
9,447,504 B1 * 9/2016 Larson ................. C09D 173/00

FOREIGN PATENT DOCUMENTS

KR 20150130903 11/2015

* cited by examiner

*Primary Examiner* — Roberts P Culbert
(74) *Attorney, Agent, or Firm* — Cantor Colburn LLP

(57) ABSTRACT

Provided is a method of manufacturing a porous current collector, which can fabricate a porous current collector in such a way as to fabricate alcohol-resolvable resin as an etch mask pattern by printing polyhydric alcohol on a surface of the alcohol-resolvable resin in a pattern and to form a plurality of through holes in a metal sheet using the etch mask pattern. The method includes the steps of forming an alcohol-resolvable resin layer by coating alcohol-resolvable resin on a surface of a metal sheet, forming an alcohol-resolvable mask pattern layer by printing polyhydric alcohol on a surface of the alcohol-resolvable resin layer after the alcohol-resolvable resin layer is formed, and etching the metal sheet so that a plurality of through holes is formed in the metal sheet using the alcohol-resolvable mask pattern layer as a mask after the alcohol-resolvable pattern layer is formed.

14 Claims, 4 Drawing Sheets

FIG. 2

| Step | | First embodiment |
|---|---|---|
| S11 | | ▬ ~110 |
| S12 | S1 | ▬ ~120 / ~110 |
| | S2 | ▬ ~120 / ~110 / ~120 |
| S20 | S21 | 131, 131, ~130 / ~120 / ~110 / ~120 |
| | S22 | 131, 131 / ~120a / ~110 / ~120 |
| | S23 | 121, 121 / ~120a / ~110 / ~120 |
| S32 | | ~111 / ~110 |

METHOD OF MANUFACTURING POROUS CURRENT COLLECTOR

BACKGROUND OF THE INVENTION

1. Technical Field

The present invention relates to a method of manufacturing a porous current collector and, more particularly, to a method of manufacturing a porous current collector, which can fabricate a porous current collector in such a way as to fabricate alcohol-resolvable resin as an etch mask pattern by printing polyhydric alcohol on a surface of the alcohol-resolvable resin in a pattern and to form a plurality of through holes in a metal sheet using the etch mask pattern.

2. Description of the Related Art

A super capacitor or secondary cell, such as an electric double layer capacitor (EDLC), includes a current collector. A porous current collector is used as the current collector in order to prevent a reduction of the capacity or output due to a reduction of binding strength with an electrode material attributable to a change with the passage of time. A plurality of through holes is formed in the porous current collector in order to prevent binding strength of the electrode material from being reduced due to a change with the passage of time. An EDLC to which the porous current collector has been applied is disclosed in Korean Patent Application Publication No. 2015-0130903 (Patent Document 1).

Korean Patent Application Publication No. 2015-0130903 relates to the high-density electrode of an EDLC and a method of manufacturing the same. The high-density electrode of an EDLC includes a porous aluminum sheet, a plurality of first hollow protrusion members, a plurality of second hollow protrusion members, a first active material sheet, and a second active material sheet. The plurality of first hollow protrusion members is formed to be protruded to one side of the porous aluminum sheet, and the plurality of second hollow protrusion members is formed to be protruded to the other side of the porous aluminum sheet. The first active material sheet is attached to one side of the porous aluminum sheet, and the second active material sheet is attached to the other side of the porous aluminum sheet.

A porous aluminum sheet, such as that disclosed in Korean Patent Application Publication No. 2015-0130903, that is, a porous current collector, has protruding members because it is fabricated using a physical force (e.g., press) using a mold. In order to solve the problem, the porous current collector is fabricated using a photolithography process. The photolithography process has a complicated manufacturing process because it requires an exposure process using a mask pattern, and thus has a problem in that the productivity of the porous current collector may be deteriorated.

PRIOR ART DOCUMENT

[Patent Document]
(Patent Document 1): Korean Patent Application Publication No. 2015-0130903 호

SUMMARY OF THE INVENTION

Accordingly, the present invention has been made keeping in mind the above problems occurring in the prior art, and an object of the present invention is to provide a method of manufacturing a porous current collector, which can fabricate a porous current collector in such a way as to fabricate alcohol-resolvable resin as an etch mask pattern by printing polyhydric alcohol on a surface of the alcohol-resolvable resin in a pattern and to form a plurality of through holes in a metal sheet using the etch mask pattern.

Another object of the present invention is to provide a method of manufacturing a porous current collector, which can reduce a manufacturing cost of a porous current collector and improve productivity because a porous current collector is fabricated in such a way as to fabricate alcohol-resolvable resin as an etch mask pattern by printing polyhydric alcohol in a pattern and to form a plurality of through holes in a metal sheet using the etch mask pattern.

A method of manufacturing a porous current collector according to an embodiment of the present invention includes the steps of forming an alcohol-resolvable resin layer by coating alcohol-resolvable resin on a surface of a metal sheet, forming an alcohol-resolvable mask pattern layer by printing polyhydric alcohol on a surface of the alcohol-resolvable resin layer after the alcohol-resolvable resin layer is formed, and etching the metal sheet so that a plurality of through holes is formed in the metal sheet using the alcohol-resolvable mask pattern layer as a mask after the alcohol-resolvable mask pattern layer is formed.

BRIEF DESCRIPTION OF THE DRAWINGS

The above and/or other aspects of the present invention will become apparent and more readily appreciated from the following description of the exemplary embodiments, taken in conjunction with the accompanying drawings in which:

FIG. 2 is a table showing a cross-sectional view according to a first embodiment of the method of manufacturing a porous current collector shown in FIG. 1.

DETAILED DESCRIPTION

Figure 1:
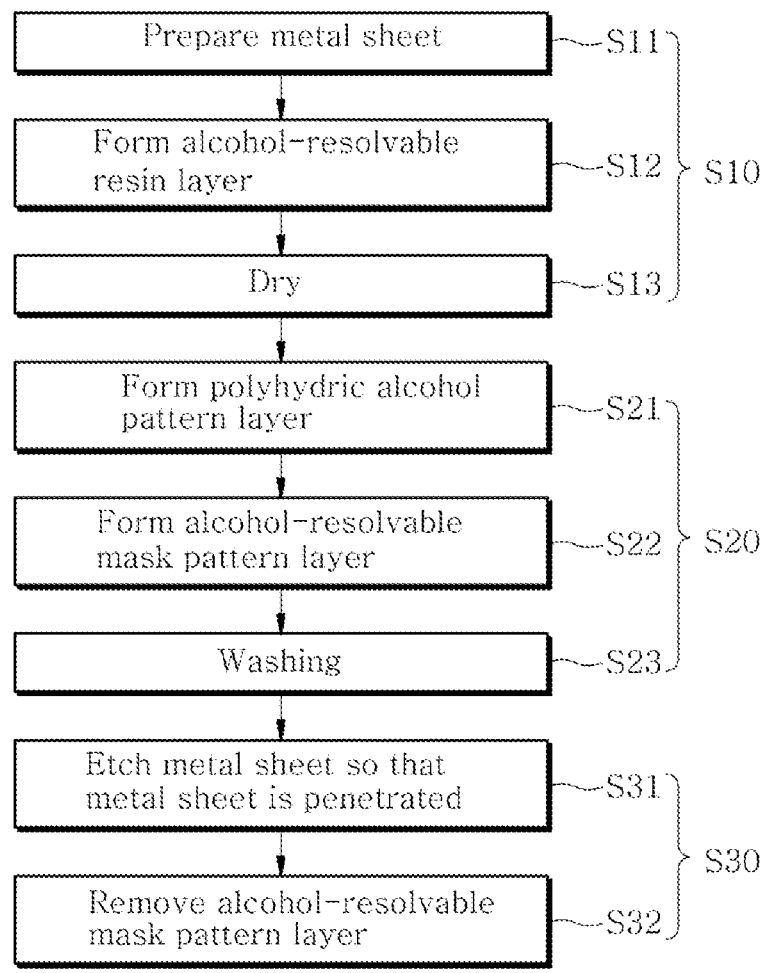
FIG. 1 is a process flow showing a method of manufacturing a porous current collector according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, methods of manufacturing a porous current collector according to embodiments of the present invention are described in detail with reference to the accompanying drawings.

As show in FIGS. 1 and 2, in a method of manufacturing a porous current collector according to an embodiment of the present invention, first, an alcohol-resolvable resin layer 120 is formed by coating alcohol-resolvable resin on a surface of a metal sheet 110 (S10). After the alcohol-resolvable resin layer 120 is formed, an alcohol-resolvable mask pattern layer 120a is formed by printing polyhydric alcohol on a surface of the alcohol-resolvable resin layer 120 (S20). After the alcohol-resolvable mask pattern layer 120a is formed, the metal sheet 110 is etched using the alcohol-resolvable mask pattern layer 120a as a mask so that a plurality of through holes 111 is formed in the metal sheet 110 (S30).

The method of manufacturing a porous current collector according to an embodiment of the present invention is described in more detail below.

In step S10 of forming the alcohol-resolvable resin layer 120, first, as shown in FIGS. 1 and 2, the metal sheet 110 is prepared (S11). That is, the metal sheet 110 shown in step S11 of FIG. 2 is prepared. The metal sheet 110 shown in step S11 of FIG. 2 is a cross-sectional view taken along line A-A of the metal sheet 110 shown in FIG. 3. One of aluminum (Al), copper (Cu), nickel (Ni) and chrome (Cr) or a mixture of two or more materials of aluminum (Al), copper (Cu), nickel (Ni) and chrome (Cr) is used as the material of the metal sheet 110. In this case, FIG. 2 shows a first embodiment of a method of manufacturing a porous current collector according to an embodiment of the present invention.

After the metal sheet 110 is prepared, as shown in FIGS. 1 and 2, the alcohol-resolvable resin layer 120 is formed by coating the alcohol-resolvable resin on a surface of the metal sheet 110 (S12). After the metal sheet 110 is prepared as in step S12 of FIG. 2, the alcohol-resolvable resin layer 120 is formed by coating the alcohol-resolvable resin on a surface of one side of the metal sheet 110 (S1). After the alcohol-resolvable resin layer 120 is formed on a surface of one side of the metal sheet 110, the alcohol-resolvable resin layer 120 is formed by coating alcohol-resolvable resin on a surface of the other side opposite one side of the metal sheet 110 (S2). In this case, the alcohol-resolvable resin layer 120 shown in step S1 and step S2 is a cross-sectional view taken along line A-A of FIG. 3.

In steps S1 and S2 of forming the alcohol-resolvable resin layer 120 by coating the alcohol-resolvable resin on the surface of one side or the other side of the metal sheet 110, the alcohol-resolvable resin layer 120 is formed by mixing the alcohol-resolvable resin 5 to 50 wt % and a solvent 50 to 95 wt %. In this case, one of hydroxy polyester resin, arcylic resin, novolac resin and polyhydroxysterene is used as the alcohol-resolvable resin, and propylene glycol monomethyl ether acetate (PGMEA) is used as the solvent.

After the alcohol-resolvable resin layer 120 is formed on the metal sheet 110, the alcohol-resolvable resin layer 120 is dried by thermal treatment (S13) as shown in FIG. 1. In step S13 of drying the alcohol-resolvable resin layer 120 by thermal treatment, the alcohol-resolvable resin layer 120 is dried in order to make volatile the solvent through the thermal treatment, and thermal treatment conditions are performed at a temperature of 50 to 200° C. for 10 to 60 seconds. That is, the alcohol-resolvable resin layer 120 is formed by mixing the alcohol-resolvable resin 5 to 50 wt % and the solvent 50 to 95 wt %. Accordingly, in order to make volatile the solvent by drying the alcohol-resolvable resin layer 120, the thermal treatment is performed on the alcohol-resolvable resin layer 120 at a temperature of 50 to 200° C. for 10 to 60 seconds.

After the alcohol-resolvable resin layer 120 is dried, as shown in FIGS. 1 and 2, step S20 of forming the alcohol-resolvable mask pattern layer 120a is performed. In step S20 of forming the alcohol-resolvable mask pattern layer 120a, a plurality of through holes 121 is formed in the alcohol-resolvable mask pattern layer 120a. The plurality of through holes 121 is formed to penetrate the alcohol-resolvable resin layer 120 so that a surface of the metal sheet 110 is exposed.

In order to form the alcohol-resolvable mask pattern layer 120a in which the plurality of through holes 121 has been formed, first, after the alcohol-resolvable resin layer 120 is formed as in step S21 of FIGS. 1 and 2, a polyhydric alcohol pattern layer 130 is formed by printing polyhydric alcohol on a surface of the alcohol-resolvable resin layer 120 (S21). As in step S21 of FIG. 2 or FIG. 3, the polyhydric alcohol pattern layer 130 is formed on one of the surfaces of the alcohol-resolvable resin layers 120 formed on the surfaces of one side and the other side of the metal sheet 110. For example, if the polyhydric alcohol pattern layer 130 is formed on a surface of the alcohol-resolvable resin layer 120 formed on a surface of one side of the metal sheet 110, the alcohol-resolvable resin layer 120 formed on a surface of the other side of the metal sheet 110 is used to protect the surface of the other side of the metal sheet 110 when the metal sheet 110 is etched. In this case, a plurality of cylindrical patterns 131 of the polyhydric alcohol pattern layer 130 is spaced apart and formed on the surface of the alcohol-resolvable resin layer 120. Only one of glycerin (or glycerine) and ethylene glycol is used as polyhydric alcohol. Glycerin or ethylene glycol has viscosity of 800 to 1500 centi Poise (cps), and polyvinyl alcohol (PVA) is added to ethylene glycol so that ethylene glycol has viscosity of 800 to 1500 cps, thereby being capable of forming the plurality of cylindrical patterns 131 using printing. The polyhydric alcohol pattern layer 130 shown in step S21 of FIG. 2 is a cross-sectional view taken along line A-A of FIG. 3.

After the polyhydric alcohol pattern layer 130 is formed, as in step S22 of FIGS. 1 and 2, the alcohol-resolvable resin layer 120 is etched by performing thermal treatment on the polyhydric alcohol pattern layer 130, thereby forming the alcohol-resolvable mask pattern layer 120a (S22). The plurality of cylindrical patterns 131 indicated by alternate long and short dash lines in step S22 of FIG. 2 shows the state in which polyhydric alcohol has reacted to one of glycerin and ethylene glycol and the alcohol-resolvable resin by thermal treatment. That is, the plurality of cylindrical patterns 131 of the polyhydric alcohol pattern layer 130 reacts to the alcohol-resolvable resin of the alcohol-resolvable resin layer 120 by the thermal treatment and etches the alcohol-resolvable resin located in accordance with a region in which the cylindrical pattern 131 has been located. Accordingly, the alcohol-resolvable mask pattern layer 120a having the plurality of through holes 121 is formed. In this case, the thermal treatment is performed at a temperature of 50 to 200° C. for 10 to 60 seconds.

Figure 4:
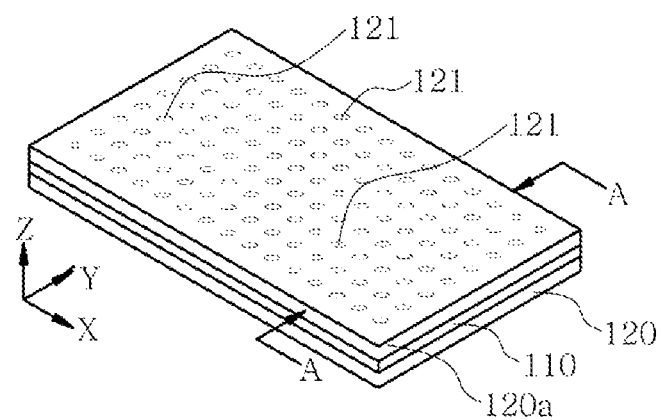
FIG. 4 is a perspective view showing the state in which the alcohol-resolvable mask pattern layer shown in FIG. 2 has been formed.

After the alcohol-resolvable mask pattern layer 120a is formed, the alcohol-resolvable mask pattern layer 120a is washed using pure water as in FIGS. 1 and 2 (S23). For example, after the alcohol-resolvable mask pattern layer 120a is formed, polyvinyl alcohol (PVA) used for viscosity of glycerin or ethylene glycol used as polyhydric alcohol is removed by washing. Accordingly, the polyhydric alcohol pattern layer 130 indicated by alternate long and short dash lines in step S22 of FIG. 2 is removed so that only the metal sheet 110 and the alcohol-resolvable mask pattern layer 120a remain as in step S23 of FIG. 2. In this case, the resolvable mask pattern layer 120a shown in step S23 of FIG. 2 is a cross-sectional view taken along line A-A of FIG. 4.

Figure 3:
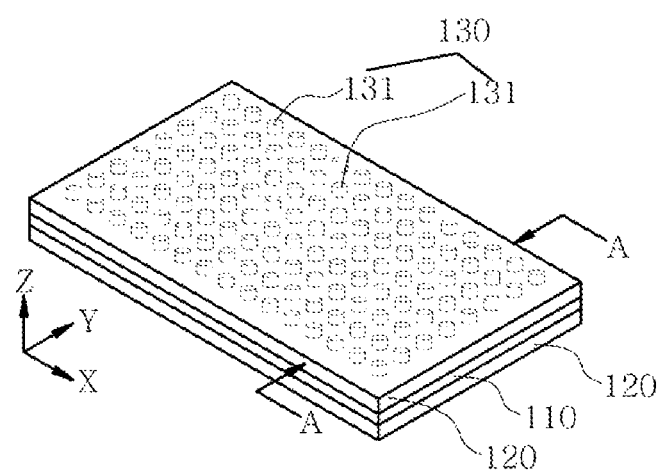
FIG. 3 is a perspective view showing the state in which polyhydric alcohol has been printed on an alcohol-resolvable resin layer shown in FIG. 2.

In step S30 of performing etching so that the plurality of through holes 111 is formed in the metal sheet 110, as in FIGS. 1, 2 and 3, first, after the alcohol-resolvable mask pattern layer 120a is formed, the metal sheet 110 is etched by an etching solution so that the metal sheet 110 is penetrated using the alcohol-resolvable mask pattern layer 120a as a mask (S31). In this case, one of hydrogen chloride (HCl), nitric acid (HNO$_3$) and ferric chloride (FeCl$_2$) is used as the etching solution. After the metal sheet 110 is penetrated, the alcohol-resolvable mask pattern layer 120a is removed by etching (S32). The alcohol-resolvable mask pattern layer 120a is fabricated as shown in step S32 of FIG. 2 by removing the alcohol-resolvable mask pattern layer 120a using caustic soda (NaOH) or an alkaline solution. In this case, the metal sheet 110 shown in step S32 of FIG. 2 is a cross-sectional view taken along line A-A of the metal sheet 110 in which the plurality of through holes 111 shown in FIG. 5 has been formed.

Figures 5, 6:
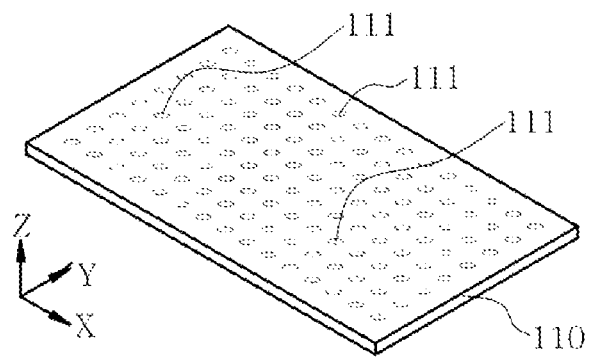
FIG. 5 is a perspective view showing the porous current collector shown in FIG. 2.
FIG. 6 is a table showing a cross-sectional view according to a second embodiment of the method of manufacturing a porous current collector shown in FIG. 1.

Another embodiment, that is, a second embodiment of the method of manufacturing a porous current collector according to an embodiment of the present invention, is shown in FIG. 6.

In the method of manufacturing a porous current collector according to the second embodiment shown in FIG. 6, step S10 of forming the alcohol-resolvable resin layer 120 by coating alcohol-resolvable resin on a surface of the metal sheet 110 and step S30 of etching the metal sheet 110 using the alcohol-resolvable mask pattern layer 120a as a mask so that the plurality of through holes 111 is formed in the metal sheet 110 after the alcohol-resolvable mask pattern layer 120a is formed are the same as those of the method of manufacturing a porous current collector according to the first embodiment, and thus a description thereof is omitted.

In the method of manufacturing a porous current collector according to an embodiment of the present invention, after the alcohol-resolvable resin layer 120 according to the second embodiment is formed, in step S20 of forming the alcohol-resolvable mask pattern layer 120a by printing polyhydric alcohol on a surface of the alcohol-resolvable resin layer 120, the polyhydric alcohol pattern layers 130 are formed by printing polyhydric alcohol on surfaces of one side and the other side of the alcohol-resolvable resin layers 120 (S21). In the polyhydric alcohol pattern layers 130 formed on the surfaces of one side and the other side of the alcohol-resolvable resin layers 120, the plurality of cylindrical patterns 131 is spaced apart and formed on the surfaces of the alcohol-resolvable resin layers 120. The plurality of cylindrical patterns 131 formed on the surface of one side of the alcohol-resolvable resin layer 120 is formed at locations corresponding to the plurality of cylindrical patterns 131 formed on the surface of the other side of the alcohol-resolvable resin layer 120 as in step S21 of FIG. 6. The alcohol-resolvable resin layer 120 may be formed in a rectangle or polygonal pattern (not shown) in addition to the plurality of cylindrical patterns 131.

Only one of glycerin and ethylene glycol is used as polyhydric alcohol used to form the plurality of cylindrical patterns 131. Such glycerin or ethylene glycol has viscosity of 800 to 1500 cps as in the first embodiment of FIG. 2. Polyvinyl alcohol (PVA) is added to ethylene glycol so that ethylene glycol has viscosity of 800 to 1500 cps, thereby being capable of forming the plurality of cylindrical patterns 131 using printing.

After the polyhydric alcohol pattern layer 130 is formed, as in step S22 of FIG. 6, the alcohol-resolvable resin layer 120 is etched by performing thermal treatment on the polyhydric alcohol pattern layer 130, thereby forming the alcohol-resolvable mask pattern layers 120a on surfaces of one side and the other side of the metal sheet 110 (S22). In step S22 of FIG. 2, the plurality of cylindrical patterns 131 indicated by alternate long and short dash lines shows the state in which polyhydric alcohol has reacted to one of glycerin and ethylene glycol and alcohol-resolvable resin by the thermal treatment. That is, the plurality of cylindrical patterns 131 of the polyhydric alcohol pattern layer 130 reacts to the alcohol-resolvable resin on the surfaces of the one side and the other sides of the alcohol-resolvable resin layers 120 by the thermal treatment. Accordingly, the alcohol-resolvable resin located in accordance with the region in which the cylindrical pattern 131 has been formed is etched to form the alcohol-resolvable mask pattern layer 120a having the plurality of through holes 121. In this case, conditions in which the thermal treatment is performed the polyhydric alcohol pattern layer 130 are performed at a temperature of 100 to 150° C. for 10 to 60 seconds.

After the alcohol-resolvable mask pattern layers 120a are formed on the surfaces of one side and the other side of the metal sheet 110, the alcohol-resolvable mask pattern layers 120a are washed using pure water (S23). For example, after the alcohol-resolvable mask pattern layers 120a are formed, PVA used for viscosity of glycerin or ethylene glycol used as polyhydric alcohol is removed by washing. Accordingly, the polyhydric alcohol pattern layer 130 indicated by the alternate long and short dash lines in step S22 of FIG. 2 is removed so that only the metal sheet 110 and the alcohol-resolvable mask pattern layers 120a remain as in step S23 of FIG. 6. Thereafter, step S30 of etching the metal sheet 110 so that the plurality of through holes 111 is formed in the metal sheet 110 is the same as that described above, and a description thereof is omitted.

In step S30 of etching the metal sheet 110 so that the plurality of through holes 111 is formed according to the first embodiment and the second embodiment, if the metal sheet 110 is made of an aluminum (Al) material, 6 to 8M (molarity) hydrogen chloride (HCl) is used as an etching solution, so a porous current collector having an opening ratio of 1 to 30% can be fabricated in the metal sheet 110 made of aluminum (Al). If the metal sheet 110 is made of a copper (Cu) material, it is processed for 5 to 20 seconds using nitric acid (HNO$_3$) of a 20 to 40% concentration using an etching solution, thereby being capable of fabricating a porous current collector having an opening ratio of 1 to 30% in the metal sheet 110 made of the copper (Cu) material. In this case, a known method is applied to the calculation of the opening ratio and a description thereof is omitted. As shown in FIG. 5, the porous current collector has the state in which the plurality of through holes 111 has been formed in the metal sheet 110.

As described above, in the method of manufacturing a porous current collector according to an embodiment of the present invention, the alcohol-resolvable mask pattern layer 120a is printed on a surface of the alcohol-resolvable resin layer 120 formed using alcohol-resolvable resin in a pattern using polyhydric alcohol. After the alcohol-resolvable resin layer 120 is fabricated to have an etch mask pattern, the plurality of through holes is formed in the metal sheet using the etch mask pattern, thereby fabricating the porous current collector. Accordingly, a manufacturing cost of the porous current collector can be reduced and productivity can be improved.

The method of manufacturing a porous current collector according to an embodiment of the present invention may be applied to the industrial fields for manufacturing a super capacitor and secondary cell, such as an EDLC.

In the method of manufacturing a porous current collector according to an embodiment of the present invention, after the alcohol-resolvable resin is fabricated in an etch mask pattern by printing polyhydric alcohol on a surface of the alcohol-resolvable resin, the plurality of through holes is formed in the metal sheet using the etch mask pattern, thereby fabricating the porous current collector. Accordingly, a manufacturing cost of the porous current collector can be reduced and productivity can be improved.

What is claimed is:

1. A method of manufacturing a porous current collector, comprising steps of:
   forming an alcohol-resolvable resin layer by coating alcohol-resolvable resin on a surface of a metal sheet;
   forming an alcohol-resolvable mask pattern layer by printing polyhydric alcohol on a surface of the alcohol-resolvable resin layer after the alcohol-resolvable resin layer is formed; and
   etching the metal sheet so that a plurality of through holes is formed in the metal sheet using the alcohol-resolvable mask pattern layer as a mask after the alcohol-resolvable mask pattern layer is formed.

2. The method of claim 1, wherein the step of forming the alcohol-resolvable resin layer comprises steps of:
   preparing the metal sheet;
   forming the alcohol-resolvable resin layer by coating the alcohol-resolvable resin on the surface of the metal sheet after the metal sheet is prepared; and
   drying the alcohol-resolvable resin layer by thermal treatment after the alcohol-resolvable resin layer is formed on the surface of the metal sheet.

3. The method of claim 2, wherein in the step of preparing the metal sheet, one of aluminum (Al), copper (Cu), nickel (Ni) and chrome (Cr) or a mixture of two or more materials of aluminum (Al), copper (Cu), nickel (Ni) and chrome (Cr) is used as a material of the metal sheet.

4. The method of claim 2, wherein the step of forming the alcohol-resolvable resin layer comprises steps of:
   forming an alcohol-resolvable resin layer by coating the alcohol-resolvable resin on a surface of one side of the metal sheet after the metal sheet is prepared; and
   forming an alcohol-resolvable resin layer by coating the alcohol-resolvable resin on a surface of the other side of the metal sheet opposite one side of the metal sheet after the alcohol-resolvable resin layer is formed on the surface of one side of the metal sheet.

5. The method of claim 4, wherein in the step of forming the alcohol-resolvable resin layer by coating the alcohol-resolvable resin on the surface of one side or the other side of the metal sheet, the alcohol-resolvable resin layer is formed by mixing the alcohol-resolvable resin 5 to 50 wt % and a solvent 50 to 95 wt %, one of hydroxy polyester resin, arcylic resin, novolac resin and polyhydroxysterene is used as the alcohol-resolvable resin, and propylene glycol monomethyl ether acetate (PGMEA) is used as the solvent.

6. The method of claim 4, wherein in the step of drying the alcohol-resolvable resin layer through the thermal treatment, the thermal treatment is performed to dry the alcohol-resolvable resin layer in order to make the solvent volatile, and conditions for the thermal treatment are performed at a temperature of 50 to 200° C. for 10 to 60 seconds.

7. The method of claim 1, wherein in the step of forming the alcohol-resolvable mask pattern layer, a plurality of through holes is formed in the alcohol-resolvable mask pattern layer, and the plurality of through holes is formed to penetrate the alcohol-resolvable resin layer so that the surface of the metal sheet is exposed.

8. The method of claim 1, wherein the step of forming the alcohol-resolvable mask pattern layer comprises steps of:
   forming a polyhydric alcohol pattern layer by printing polyhydric alcohol on a surface of the alcohol-resolvable resin layer after the alcohol-resolvable resin layer is formed; and
   forming the alcohol-resolvable mask pattern layer by etching the alcohol-resolvable resin layer by performing thermal treatment on the polyhydric alcohol pattern layer after the polyhydric alcohol pattern layer is formed; and
   washing the alcohol-resolvable mask pattern layer using pure water after the alcohol-resolvable mask pattern layer is formed.

9. The method of claim 8, wherein in the step of forming the polyhydric alcohol pattern layer by printing the polyhydric alcohol, a plurality of cylindrical patterns of the polyhydric alcohol pattern layer is spaced apart and formed in a surface of the alcohol-resolvable resin layer.

10. The method of claim 7, wherein in the step of forming the polyhydric alcohol pattern layer by printing the polyhydric alcohol, only one of glycerin and ethylene glycol is used as the polyhydric alcohol, glycerin or ethylene glycol having viscosity of 800 to 1500 centi Poise (cps) is used, and the ethylene glycol has viscosity of 800 to 1500 cps by adding polyvinyl alcohol (PVA).

11. The method of claim 7, wherein in the step of forming the alcohol-resolvable mask pattern layer, thermal treatment is performed at a temperature of 100 to 150° C. for 10 to 60 seconds.

12. The method of claim 1, wherein the step of etching the metal sheet so that the plurality of through holes is formed in the metal sheet comprises steps of:
   etching the metal sheet so that the metal sheet is penetrated by an etching solution using the alcohol-resolvable mask pattern layer as a mask after the alcohol-resolvable mask pattern layer is formed; and
   removing the alcohol-resolvable mask pattern layer by etching after the metal sheet is penetrated by etching.

13. The method of claim 12, wherein in the step of etching the metal sheet so that the plurality of through holes is formed in the metal sheet, one of hydrogen chloride (HCl), nitric acid ($HNO_3$) and ferric chloride ($FeCl_2$) is used as the etching solution.

14. The method of claim 12, wherein in the step of removing the alcohol-resolvable mask pattern layer by etching, the alcohol-resolvable mask pattern layer is removed using caustic soda (NaOH) or an alkaline solution.

* * * * *